(12) United States Patent
Araki et al.

(10) Patent No.: US 8,981,040 B2
(45) Date of Patent: *Mar. 17, 2015

(54) CATIONICALLY POLYMERIZABLE RESIN, CATIONICALLY POLYMERIZABLE RESIN COMPOSITION, AND CURED PRODUCTS THEREOF

(75) Inventors: Naoko Araki, Himeji (JP); Yoshinori Funaki, Himeji (JP); Kiyoharu Tsutsumi, Himeji (JP); Tomoaki Mahiko, Himeji (JP)

(73) Assignee: Daicel Corporation, Osaka-Shi (JP)

( * ) Notice: Subject to any disclaimer, the term of this patent is extended or adjusted under 35 U.S.C. 154(b) by 229 days.

This patent is subject to a terminal disclaimer.

(21) Appl. No.: 13/578,561
(22) PCT Filed: Jan. 24, 2011
(86) PCT No.: PCT/JP2011/051174
§ 371 (c)(1),
(2), (4) Date: Aug. 10, 2012
(87) PCT Pub. No.: WO2011/099352
PCT Pub. Date: Aug. 18, 2011

(65) Prior Publication Data
US 2012/0309930 A1 Dec. 6, 2012

(30) Foreign Application Priority Data
Feb. 12, 2010 (JP) .................................. 2010-029321

(51) Int. Cl.
C08F 220/32 (2006.01)
C08G 65/18 (2006.01)
(Continued)

(52) U.S. Cl.
CPC ................ *C08G 65/18* (2013.01); *C08G 65/22* (2013.01); *C08F 220/32* (2013.01); *C08F 2220/282* (2013.01)
USPC ............................ 528/361; 549/510; 526/266

(58) Field of Classification Search
CPC .. C08G 65/18; C08G 65/22; C08F 2220/282; C08F 220/32

USPC ............................ 528/361; 549/510; 526/266
See application file for complete search history.

(56) References Cited

U.S. PATENT DOCUMENTS

2003/0166737 A1* 9/2003 Dede et al. ........................ 522/7
(Continued)

FOREIGN PATENT DOCUMENTS

JP 11-315181 A 11/1999
(Continued)

OTHER PUBLICATIONS

El-Ghayoury, A. et al., "Ultraviolet-Ultraviolet Dual-Cure Process Based on Acrylate Oxetane Monomers", Journal of Polymer Science: Part A: Polymer Chemistry, vol. 41, pp. 469-475 (2002).
(Continued)

*Primary Examiner* — Mark Kaucher
(74) *Attorney, Agent, or Firm* — Birch, Stewart, Kolasch & Birch, LLP

(57) ABSTRACT

Provided is a cationically polymerizable resin which is rapidly cured upon irradiation with light and forms a cured product excellent in flexibility and thermal stability. The cationically polymerizable resin is obtained through radical polymerization of an oxetane-ring-containing (meth)acryloyl compound represented by following Formula (1) alone or in combination with another radically polymerizable compound. In the formula, $R^1$ represents hydrogen atom or methyl group; $R^2$ represents hydrogen atom or an alkyl group; and "A" represents a linear or branched chain alkylene group having 2 to 20 carbon atoms.

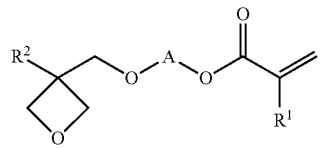

17 Claims, 1 Drawing Sheet

(51) Int. Cl.
*C08G 65/22* (2006.01)
*C08F 220/28* (2006.01)

(56) References Cited

U.S. PATENT DOCUMENTS

2009/0124776 A1* 5/2009 Takai ............................ 526/268
2009/0263588 A1* 10/2009 Kakino ......................... 427/487
2009/0324831 A1* 12/2009 Mori et al. ................... 427/256
2012/0232295 A1* 9/2012 Son et al. ..................... 549/510

FOREIGN PATENT DOCUMENTS

| JP | 2001-40205 A | | 2/2001 |
|----|--------------|---|--------|
| JP | 2005-97515 A | | 4/2005 |
| JP | 2008-224970 A | | 9/2008 |
| JP | 2009-242242 A | | 10/2009 |
| JP | 2009-256552 A | | 11/2009 |
| JP | 2009-256553 A | | 11/2009 |
| JP | 2010217355 A | * | 9/2010 |

OTHER PUBLICATIONS

Sangermano, M. et al., "Synthesis and characterization of acrylate-oxetane interpenetrating polymer networks through a thermal-UV dual cure process", Progress in Organic Coatings 55 (2006), pp. 225-230.

* cited by examiner

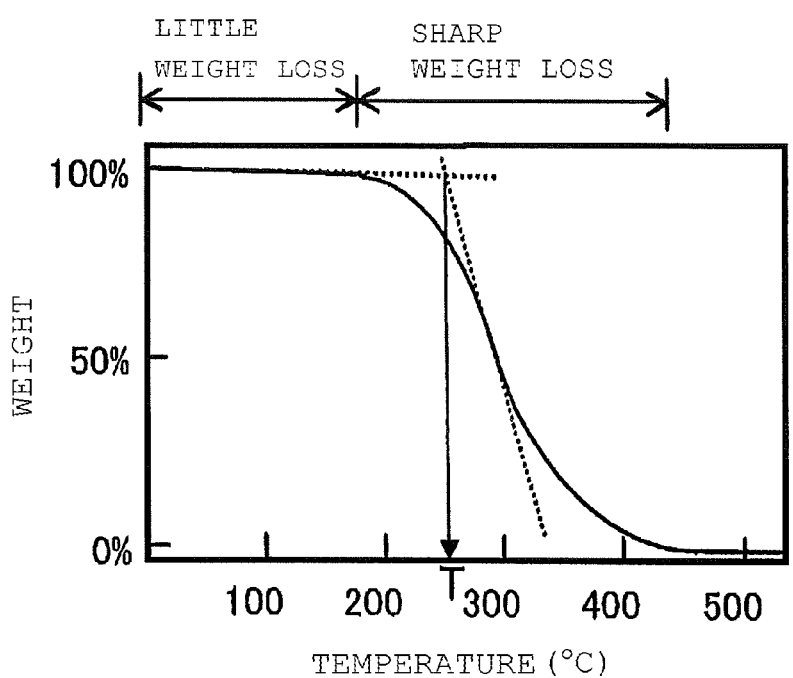

CATIONICALLY POLYMERIZABLE RESIN, CATIONICALLY POLYMERIZABLE RESIN COMPOSITION, AND CURED PRODUCTS THEREOF

TECHNICAL FIELD

The present invention relates to cationically polymerizable resins, cationically polymerizable resin compositions, and cured products thereof, which are useful typically in the areas of waveguides (e.g., optical waveguides and hybrid (wiring) boards), optical fibers, stress-relaxation adhesives, sealants, underfill materials, ink-jet inks, color filters, nanoimprinting, flexible boards and are particularly useful typically in the areas of flexible optical waveguides, flexible adhesives, and underfill materials.

BACKGROUND ART

With widespread proliferation of video distribution via internet, boards used as servers or routers have increasing channel capacities. To meet this, there have been increasingly studied techniques of replacing part of high-speed signal lines from an electric wiring to an optical wiring. Polymer optical waveguides are expected as optical wiring for photoelectric hybrid boards because of being available at lower cost than that of quartz optical waveguides. One of required properties of such polymer optical waveguides is thermal stability upon solder reflow (solder reflow thermal stability), which prevents thermal degradation such as increased optical loss and cracking caused by a high temperature treatment in a solder reflow process. In recent years, the polymer optical waveguides require more satisfactory thermal stability. This is because a higher reflow temperature is required to meet the use of lead-free solder whose melting requires heating at a high temperature of about 260° C.

In addition, the polymer optical waveguides also require flexibility from the viewpoints of easy binding with elements or substrates, degree of freedom in the layout, stress relaxation, and handleability. Specifically, polymers for use as polymer optical waveguides require excellent flexibility and satisfactory thermal stability even at temperatures higher than 260° C.

Patent Literature (PTL) 1 and PTL 2 disclose 3-ethyl-3-(meth)acryloyloxymethyloxetane and other compounds having an oxetane ring and a (meth)acryloyl group per one molecule. However, these compounds give cured products which have poor flexibility although they have satisfactory thermal stability.

PTL 3 and PTL 4 disclose glycidyl (meth)acrylate, 3,4-epoxycyclohexylmethyl (meth)acrylate, and other epoxy compounds having an epoxy group and a (meth)acryloyl group per one molecule. However, these compounds have poor curability, have skin irritation and toxicity, and are thereby problematic in workability. In addition, these compounds give cured products which do not have sufficiently satisfactory flexibility. As is described above, there has not yet been found a resin capable of forming a cured product which excels both in flexibility and thermal stability.

CITATION LIST

PTL

PTL 1: Japanese Unexamined Patent Application Publication (JP-A) No. H11-315181

PTL 2: Japanese Unexamined Patent Application Publication (JP-A) No. 2001-40205

PTL 3: Japanese Unexamined Patent Application Publication (JP-A) No. 2005-97515

PTL 4: Japanese Unexamined Patent Application Publication (JP-A) No. 2009-242242

SUMMARY OF INVENTION

Technical Problem

Accordingly, an object of the present invention is to provide a cationically polymerizable resin capable of being rapidly cured through irradiation with light to form a cured product which is excellent in flexibility and thermal stability; a composition of such cationically polymerizable resin; and a cured product obtained therefrom.

Solution to Problem

After intensive investigations to achieve the object, the present inventors have found a specific resin which is obtained by radical polymerization of a specific monomer alone or in combination with another monomer having a functional group being reactive with (meth)acryloyl group; in which the specific monomer has, per one molecule, a radically polymerizable (meth)acryloyl group and a cationically polymerizable oxetane ring imparting flexibility, where these two functional groups are linked to each other through an alkylene group having a specific structure. The present inventors have found that the specific resin forms, through cationic polymerization, a cured product which excels in thermal stability and flexibility. The present invention has been made based on these findings.

Specifically, the present invention provides, in an aspect, a cationically polymerizable resin obtained through radical polymerization of an oxetane-ring-containing (meth)acryloyl compound alone or in combination with another radically polymerizable compound, the oxetane-ring-containing (meth)acryloyl compound being represented by following Formula (1):

[Chem. 1]

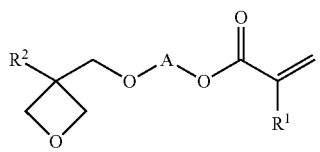

(1)

wherein $R^1$ represents hydrogen atom or methyl group; $R^2$ represents hydrogen atom or an alkyl group; and "A" represents a linear or branched chain alkylene group having 2 to 20 carbon atoms.

The other radically polymerizable compound is preferably a compound having one functional group selected from the group consisting of a (meth)acryloyl group, a (meth)acryloyloxy group, a (meth)acryloylamino group, a vinylaryl group, a vinyl ether group, and a vinyloxycarbonyl group per one molecule.

The present invention provides, in another aspect, a cationically polymerizable resin composition including the cationically polymerizable resin as a cationically polymerizable compound.

The cationically polymerizable resin composition preferably further includes another cationically polymerizable compound than the cationically polymerizable resin. The other cationically polymerizable compound than the cationically polymerizable resin is preferably a compound having one or more functional groups selected from the group consisting of oxetane rings, epoxy rings, vinyl ether groups, and vinylaryl groups per one molecule.

The cationically polymerizable resin composition preferably further contains a cationic-polymerization initiator.

The present invention provides, in yet another aspect, a cured product obtained through cationic polymerization of the cationically polymerizable resin composition.

The cured product is preferably in the form of a film or fiber.

Advantageous Effects of Invention

The cationically polymerizable resin according to the present invention is a resin obtained through radical polymerization of an oxetane-ring-containing (meth)acryloyl compound having a specific structure alone or in combination with another radically polymerizable compound and can thereby rapidly form a cured product through cationic polymerization upon irradiation with light. The resulting cured product has satisfactory flexibility, can be bent freely upon use, and can exhibit a stress relaxation action. In addition, the cured product has such thermal stability as to be applicable to solder reflow mounting (particularly, lead-free solder mounting) and can prevent thermal degradation due to solder reflow. The cationically polymerizable resin according to the present invention is therefore advantageously usable typically in the areas of waveguides (e.g., optical waveguides and hybrid boards), optical fibers, stress-relaxation adhesives, sealants, underfill materials, ink-jet inks, color filters, nanoimprinting, and flexible boards and is particularly advantageously usable typically in the areas of flexible optical waveguides, flexible adhesives, and underfill materials.

BRIEF DESCRIPTION OF DRAWINGS

FIG. 1 is an explanatory drawing (schematic view indicating data of thermogravimetry) illustrating how to evaluate the thermal stability of a cured product.

DESCRIPTION OF EMBODIMENTS

[Oxetane-Ring-Containing (Meth)Acrylic Ester Compound]

An oxetane-ring-containing (meth)acrylic ester compound for use in the present invention is represented by Formula (1), in which $R^1$ represents hydrogen atom or methyl group; $R^2$ represents hydrogen atom or an alkyl group; and "A" represents a linear or branched chain alkylene group having 2 to 20 carbon atoms.

In Formula (1), the alkyl group as $R^2$ is preferably an alkyl group having 1 to 6 carbon atoms, which is typified by linear alkyl groups having 1 to 6 carbon atoms, such as methyl, ethyl, propyl, butyl, pentyl, and hexyl groups, of which those having 1 to 3 carbon atoms are more preferred; and branched chain alkyl groups having 1 to 6 carbon atoms, such as isopropyl, isobutyl, s-butyl, t-butyl, isopentyl, s-pentyl, t-pentyl, isohexyl, s-hexyl, and t-hexyl groups, of which those having 1 to 3 carbon atoms are more preferred. The substituent $R^2$ herein is preferably methyl group or ethyl group.

In Formula (1), "A" represents a linear or branched chain alkylene group having 2 to 20 carbon atoms. The group "A" herein is preferably a linear alkylene group represented by following Formula (a1) or a branched chain alkylene group represented by following Formula (a2), because the resulting resin can form a cured product having both satisfactory thermal stability and excellent flexibility. The rightmost end of Formula (a2) is bonded to the oxygen atom constituting the ester bond.

[Chem. 2]

In Formula (a1), n1 denotes an integer of 2 or more. In Formula (a2), $R^3$, $R^4$, $R^7$, and $R^8$ are the same as or different from one another and each represent hydrogen atom or an alkyl group; $R^5$ and $R^6$ are the same as or different from each other and each represent an alkyl group; and n2 denotes an integer of 0 or more. When n2 is an integer of 2 or more, two or more $R^7$s may be the same as or different from one another, and two or more $R^8$s may be the same as or different from one another.

In Formula (a1), n1 denotes an integer of 2 or more and is preferably an integer of from 2 to 20, and particularly preferably an integer of from 2 to 10. A compound in which n1 is 1 may give, through polymerization, a cured product which tends to have insufficient flexibility.

In Formula (a2), the alkyl groups as $R^3$, $R^4$, $R^5$, $R^6$, $R^7$, and $R^8$ are preferably alkyl groups having 1 to 4 carbon atoms, which are typified by linear alkyl groups having 1 to 4 carbon atoms, such as methyl, ethyl, propyl, and butyl groups, of which those having 1 to 3 carbon atoms are more preferred; and branched-chain alkyl groups having 1 to 4 carbon atoms, such as isopropyl, isobutyl, s-butyl, and t-butyl groups, of which those having 1 to 3 carbon atoms are more preferred. $R^3$ and $R^4$ herein are preferably hydrogen atoms; whereas $R^5$ and $R^6$ are each preferably methyl group or ethyl group.

The number n2 in Formula (a2) is an integer of 0 or more, preferably an integer of from 1 to 20, and particularly preferably an integer of from 1 to 10.

Typical examples of the oxetane-ring-containing (meth)acrylic ester compound represented by Formula (1) include the following compounds:

[Chem. 3]

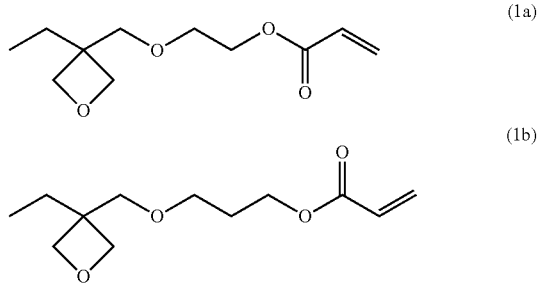

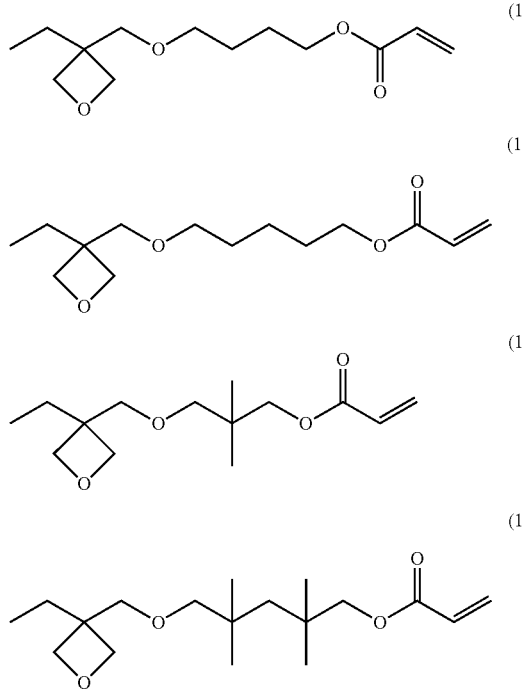

The oxetane-ring-containing (meth)acrylic ester compound represented by Formula (1) may be synthetically prepared typically by allowing a compound represented by following Formula (2):

[Chem. 4]

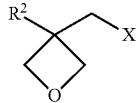

(2)

wherein $R^2$ is as defined above; and X represents a leaving group,
to react with a compound represented by following Formula (3):

 (3)

wherein "A" is as defined above,
in the presence of a basic substance in a single-liquid phase system to give an oxetane-ring-containing alcohol represented by following Formula (4):

[Chem. 5]

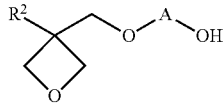

(4)

wherein $R^2$ and "A" are as defined above;
and (meth)acrylating the oxetane-ring-containing alcohol.

In Formula (2), X represents a leaving group, which is typified by groups having high leaving ability, including halogen atoms such as chlorine, bromine, and iodine atoms, of which bromine atom and iodine atom are preferred; sulfonyloxy groups such as p-toluenesulfonyloxy group, methanesulfonyloxy group, and trifluoromethanesulfonyloxy group; and carbonyloxy groups such as acetyloxy group.

Examples of the basic substance include hydroxides of alkali metals or alkaline earth metals, such as sodium hydroxide, potassium hydroxide, calcium hydroxide, and magnesium hydroxide; hydrides of alkali metals or alkaline earth metals, such as sodium hydride, magnesium hydride, and calcium hydride; carbonates of alkali metals or alkaline earth metals, such as sodium carbonate, sodium hydrogen carbonate, potassium carbonate, and potassium hydrogen carbonate; and organic metallic compounds including organic lithium reagents (e.g., methyllithium, ethyllithium, n-butyllithium, sec-butyllithium, and ter-butyllithium) and organic magnesium reagents (Grignard reagents such as $CH_3MgBr$ and $C_2H_5MgBr$). Each of them may be used alone or in combination.

As used herein the term "single-liquid phase system" refers to a system including a liquid phase in a number of only one (i.e., excluding systems including two or more liquid phases). The system may also include a solid, as long as it includes only one liquid phase. A solvent for use herein may be any one, as long as capable of dissolving both the compound represented by Formula (2) and the compound represented by Formula (3) therein. Examples of such solvents include aromatic hydrocarbons such as benzene, toluene, xylenes, and ethylbenzene; ethers such as THF (tetrahydrofuran) and IPE (isopropyl ether); sulfur-containing solvents such as DMSO (dimethyl sulfoxide); and nitrogen-containing solvents such as DMF (dimethylformamide).

[Cationically Polymerizable Resin]

A cationically polymerizable resin according to an embodiment of the present invention is obtained through radical polymerization of the oxetane-ring-containing (meth)acryloyl compound represented by Formula (1) alone or in combination with another radically polymerizable compound. The latter compound is a compound being radically polymerizable and being other than the oxetane-ring-containing (meth)acryloyl compound represented by Formula (1) (hereinafter also referred to as "other radically polymerizable compound").

The oxetane-ring-containing (meth)acrylic ester compound represented by Formula (1) has, per one molecule, an oxetane ring serving as a cationically polymerizable moiety and a (meth)acryloyl group serving as a radically polymerizable moiety and, through radical polymerization alone or through radical copolymerization with another radically polymerizable compound, can synthetically give a cationically polymerizable resin represented by the following formula. The "radical copolymerization" herein includes, but is not limited to, block copolymerization and random copolymerization:

[Chem. 6]

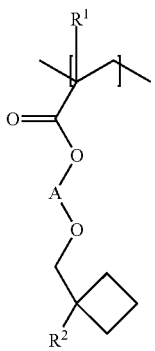

wherein R¹, R², and "A" are as defined above.

Among such resins, the cationically polymerizable resin according to the present invention is preferably a resin obtained through radical copolymerization of the oxetane-ring-containing (meth)acryloyl compound represented by Formula (1) with another radically polymerizable compound so as to form a cured product having more satisfactory flexibility. The cationically polymerizable resin is more preferably a resin which is obtained through such a radical copolymerization that a monomer derived from the oxetane-ring-containing (meth)acryloyl compound represented by Formula (1) occupies 0.1 percent by weight or more and less than 100 percent by weight, preferably 1 to 99 percent by weight, more preferably 10 to 80 percent by weight, and furthermore preferably 10 to 50 percent by weight, based on the total amount of monomers constituting the cationically polymerizable resin.

Examples of the other radically polymerizable compound include compounds having, per one molecule, one or more radically polymerizable groups such as (meth)acryloyl groups, (meth)acryloyloxy groups, (meth)acryloylamino groups, vinyl ether groups, vinylaryl groups, and vinyloxycarbonyl groups.

Exemplary compounds having one or more (meth)acryloyl groups per one molecule include 1-buten-3-one, 1-penten-3-one, 1-hexen-3-one, 4-phenyl-1-buten-3-one, and 5-phenyl-1-penten-3-one; and derivatives of them.

Exemplary compounds having one or more (meth)acryloyloxy groups per one molecule include methyl (meth)acrylate, ethyl (meth)acrylate, n-butyl (meth)acrylate, isobutyl (meth)acrylate, t-butyl methacrylate, n-hexyl (meth)acrylate, 2-ethylhexyl (meth)acrylate, isodecyl (meth)acrylate, n-lauryl (meth)acrylate, n-stearyl (meth)acrylate, n-butoxyethyl (meth)acrylate, butoxydiethylene glycol (meth)acrylate, methoxytriethylene glycol (meth)acrylate, methoxypolyethylene glycol (meth)acrylate, cyclohexyl (meth)acrylate, tetrahydrofurfuryl (meth)acrylate, benzyl (meth)acrylate, phenoxyethyl (meth)acrylate, isobornyl (meth)acrylate, 2-hydroxyethyl (meth)acrylate, 2-hydroxypropyl (meth)acrylate, 2-hydroxybutyl (meth)acrylate, dimethylaminoethyl (meth)acrylate, diethylaminoethyl (meth)acrylate, methacrylic acid, 2-methacryloyloxyethyl succinate, 2-methacryloyloxyethyl hexahydrophthalate, 2-methacryloyloxyethyl-2-hydroxypropyl phthalate, glycidyl (meth)acrylate, 2-methacryloyloxyethyl acid phosphate (2-hydroxyethyl methacrylate phosphate), ethylene glycol di(meth)acrylate, diethylene glycol di(meth)acrylate, triethylene glycol di(meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth)acrylate, decane di(meth)acrylate, glycerol di(meth)acrylate, 2-hydroxy-3-acryloyloxypropyl (meth)acrylate, dimethyloltricyclodecane di(meth)acrylate, trifluoroethyl (meth)acrylate, perfluorooctylethyl (meth)acrylate, isoamyl (meth)acrylate, isomyristyl (meth)acrylate, γ-(meth)acryloyxpropyltrimethoxysilane, 2-(meth)acryloyloxyethyl isocyanate, 1,1-bis(acryloyloxy)ethyl isocyanate, 2-(2-methacryloyloxyethyloxy)ethyl isocyanate, vinyltrimethoxysilane, vinyltriethoxysilane, and 3-(meth)acryloyxpropyltriethoxysilane; and derivatives of them.

Exemplary compounds having one or more (meth)acryloylamino groups per one molecule include morpholin-4-yl acrylate, acryloylmorpholine, N,N-dimethylacrylamide, N,N-diethylacrylamide, N-methylacrylamide, N-ethylacrylamide, N-propylacrylamide, N-isopropylacrylamide, N-butylacrylamide, N-n-butoxymethylacrylamide, N-hexylacrylamide, and N-octylacrylamide; and derivatives of them.

Exemplary compounds having one or more vinyl ether groups per one molecule include 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,4-cyclohexanedimethanol monovinyl ether, 1,3-cyclohexanedimethanol monovinyl ether, 1,2-cyclohexanedimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ethers, polyethylene glycol monovinyl ethers, dipropylene glycol monovinyl ether, tripropylene glycol monovinyl ether, tetrapropylene glycol monovinyl ether, pentapropylene glycol monovinyl ether, oligopropylene glycol monovinyl ethers, and polypropylene glycol monovinyl ethers; and derivatives of them.

Exemplary compounds having one or more vinylaryl groups per one molecule include styrene, divinylbenzene, methoxystyrene, ethoxystyrene, hydroxystyrene, vinylnaphthalene, vinylanthracene, 4-vinylphenyl acetate, (4-vinylphenyl)dihydroxyborane, (4-vinylphenyl)boranic acid, (4-vinylphenyl)boronic acid, 4-ethenylphenylboronic acid, 4-vinylphenylboranic acid, 4-vinylphenylboronic acid, p-vinylphenylboric acid, p-vinylphenylboronic acid, N-(4-vinylphenyl)maleinimide, N-(p-vinylphenyl)maleimide, and N-(p-vinylphenyl)maleinimide; and derivatives of them.

Exemplary compounds having one or more vinyloxycarbonyl groups per one molecule include isopropenyl formate, isopropenyl acetate, isopropenyl propionate, isopropenyl butyrate, isopropenyl isobutyrate, isopropenyl caproate, isopropenyl valerate, isopropenyl isovalerate, isopropenyl lactate, vinyl acetate, vinyl propionate, vinyl butyrate, vinyl caproate, vinyl caprylate, vinyl laurate, vinyl myristate, vinyl palmitate, vinyl stearate, vinyl cyclohexanecarboxylate, vinyl pivalate, vinyl octanoate, vinyl monochloroacetate, divinyl adipate, vinyl methacrylate, vinyl crotonate, vinyl sorbate, vinyl benzoate, and vinyl cinnamate; and derivatives of them.

Among them, the other radically polymerizable compound for use in the present invention is preferably a compound having one functional group selected from the group consisting of (meth)acryloyl group, (meth)acryloyloxy group, (meth)acryloylamino group, a vinylaryl group, vinyl ether group, vinyloxycarbonyl group per one molecule and is particularly preferably a compound having one (meth)acryloyloxy group per one molecule, which is typified by n-butyl (meth)acrylate, isobutyl (meth)acrylate, t-butyl methacrylate, n-hexyl (meth)acrylate, or 2-ethylhexyl (meth)acrylate. These compounds contribute to the formation of a cured product excellent in flexibility and thermal stability. Each of them may be used alone or in combination.

The radical polymerization reaction may be promoted by performing a heating treatment and/or light irradiation. The temperature of the heating treatment, when performed, may be regulated according typically to the types of components and catalyst for use in the reaction and is typically from about 20° C. to about 200° C., preferably from about 50° C. to about 150° C., and more preferably from about 70° C. to about 120° C. Exemplary light sources for use in the light irradiation, when performed, include mercury lamps, xenon lamps, carbon arc lamps, metal halide lamps, sunlight, electron beams, and laser beams. After the light irradiation, a heating treatment may be performed at a temperature of typically from about 50° C. to about 180° C. to allow the radical polymerization reaction to further proceed.

The radical polymerization reaction is performed in the presence of a solvent. Exemplary solvents include 1-methoxy-2-acetoxypropane (PGMEA), benzene, and toluene.

The radical polymerization reaction may employ a polymerization initiator. The polymerization initiator may be any of known or customary initiators not limited, as long as those being capable of inducing a radical polymerization. They are typified by thermal initiators and photo-induced radical polymerization initiators, such as benzoyl peroxide, azobisisobutyronitrile (AIBN), azobis-2,4-dimethylvaleronitrile, and dimethyl 2,2'-azobis(isobutyrate).

The polymerization initiator is used in the radical polymerization reaction in an amount of typically from about 0.01 to about 50 percent by weight, and preferably from about 0.1 to about 20 percent by weight, based on the total amount of radically polymerizable compound(s) (total weight of the oxetane-ring-containing (meth)acrylic ester compound represented by Formula (1) and the other radically polymerizable compound).

The cationically polymerizable resin has a weight-average molecular weight of typically 500 or more (e.g., from about 500 to about $100 \times 10^4$), and preferably from 3000 to $50 \times 10^4$. The cationically polymerizable resin, if having a weight-average molecular weight out of the range, may tend to give a cured product having insufficient flexibility, which cured product is obtained through curing of the cationically polymerizable resin composition.

The cationically polymerizable resin has a number-average molecular weight of typically 100 or more (e.g., from about 100 to about $50 \times 10^4$), and preferably from 300 to $25 \times 10^4$. The cationically polymerizable resin, if having a number-average molecular weight out of the range, may tend to give a cured product having insufficient flexibility, which cured product is obtained through curing of the cationically polymerizable resin composition.

[Cationically Polymerizable Resin Composition]

A cationically polymerizable resin composition according to an embodiment of the present invention includes the cationically polymerizable resin as a cationically polymerizable compound.

The cationically polymerizable resin composition includes the cationically polymerizable resin in a content of typically 5 percent by weight or more and may substantially include the cationically polymerizable resin alone. For the formation of a cured product having more satisfactory flexibility, the cationically polymerizable resin composition includes the cationically polymerizable resin in a content of preferably from 10 to 95 percent by weight, and particularly preferably in a content of from 40 to 95 percent by weight. The cationically polymerizable resin composition, if including the cationically polymerizable resin in a content of less than 5 percent by weight, may tend to give a cured product having insufficient flexibility through cationic polymerization.

The cationically polymerizable resin composition according to the present invention may further contain, in addition to the cationically polymerizable resin, a compound (hereinafter also referred to as "other cationically polymerizable compound") which is cationically polymerizable and is other than the oxetane-ring-containing (meth)acryloyl compound represented by Formula (1).

Examples of the other cationically polymerizable compound include compounds having one or more cationically polymerizable groups, such as oxetane rings, epoxy rings, vinyl ether groups, and vinylaryl groups, per one molecule.

Exemplary compounds having one or more oxetane rings per one molecule include 3,3-bis(vinyloxymethyl)oxetane, 3-ethyl-3-hydroxymethyloxetane, 3-ethyl-3-(2-ethylhexyloxymethyl)oxetane, 3-ethyl-3-(hydroxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl (3-oxetanyl)]methyl} ether, 4,4'-bis[(3-ethyl-3-oxetanyl)methoxymethyl] bicyclohexyl, 1,4-bis[(3-ethyl-3-oxetanyl)methoxymethyl]cyclohexane, and 3-ethyl-3[[(3-ethyloxetan-3-yl)methoxy]methyl]oxetane.

Exemplary compounds having one or more epoxy rings per one molecule include bisphenol-A diglycidyl ether, bisphenol-F diglycidyl ether, bisphenol-S diglycidyl ether, brominated bisphenol-A diglycidyl ether, brominated bisphenol-F diglycidyl ether, brominated bisphenol-S diglycidyl ether, epoxy-novolak resin, hydrogenated bisphenol-A diglycidyl ether, hydrogenated bisphenol-F diglycidyl ether, hydrogenated bisphenol-S diglycidyl ether, 3,4-epoxycyclohexylmethyl 3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexyl 3',4'-epoxy-6'-methylcyclohexanecarboxylate, methylene-bis(3,4-epoxycyclohexane), dicyclopentadiene diepoxide, ethylene glycol di(3,4-epoxycyclohexylmethyl) ether, ethylene-bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glyceryl triglycidyl ether, trimethylolpropane triglycidyl ether, polyethylene glycol diglycidyl ethers, and polypropylene glycol diglycidyl ethers; polyglycidyl ethers of polyetherpolyols which are obtained by adding one or more alkylene oxides to an aliphatic polyhydric alcohol (e.g., ethylene glycol, propylene glycol, or glycerol); diglycidyl esters of aliphatic long-chain dibasic acids; monoglycidyl ethers of aliphatic higher alcohols; monoglycidyl ethers of phenol, cresol, butylphenol, or a polyether alcohol which is obtained by adding an alkylene oxide to these compounds; and glycidyl esters of higher fatty acids.

Exemplary compounds having one or more vinyl ether groups per one molecule and exemplary compounds having one or more vinylaryl groups per one molecule are as exemplified in the other radically polymerizable compounds.

Among them, preferred as the other cationically polymerizable compound for use in the present invention are compounds having one or more oxetane rings per one molecule, which are typified by 3-ethyl-3-(2-ethylhexyloxymethyl)oxetane, 3,3-bis(vinyloxymethyl)oxetane, 1,4-bis[(3-ethyl-3-oxetanylmethoxy)methyl]benzene, 3-ethyl-3[[ (3-ethyloxetan-3-yl)methoxy]methyl]oxetane, because the resulting cationically polymerizable resin composition can be rapidly cured upon irradiation with light. Each of them may be used alone or in combination.

The cationically polymerizable resin composition according to the present invention preferably further includes such other cationically polymerizable compound in addition to the cationically polymerizable resin, for the formation of a cured product having more satisfactory flexibility. The compositional ratio of the cationically polymerizable resin to the other cationically polymerizable compound (former/latter: weight ratio) is typically from 95/5 to 10/90, preferably from 95/5 to 20/80, and particularly preferably from 95/5 to 45/55. The resin composition, if containing the cationically polymerizable resin in a compositional ratio less than the range, may tend to give a cured product having insufficient flexibility.

The cationically polymerizable resin composition may further contain a polymerization initiator according to necessity. Without limitation, the polymerization initiator can be any of known or customary photo-induced cationic-polymerization initiators, light-activatable acid generators, and other initiators that can induce a cationic polymerization. Exemplary polymerization initiators include sulfonium salts such as triallylsulfonium hexafluorophosphate and triarylsulfonium hexafluoroantimonates; iodonium salts such as diaryliodonium hexafluorophosphates, diphenyliodonium hexafluoroantimonate, bis(dodecylphenyl)iodonium tetrakis(pentafluorophenyl)borate, and iodonium [4-(4-methylphenyl-2-methylpropyl)phenyl]hexafluorophosphate; phosphonium salts such as tetrafluorophosphonium hexafluorophosphate; and pyridium salts.

The light-activatable acid generators for use herein may be commercial products such as one under the trade name "CPI-100P" (supplied by SAN-APRO LIMITED).

The amount of the polymerization initiator in the cationic polymerization reaction is from about 0.01 to about 50 percent by weight, and preferably from about 0.1 to about 20 percent by weight, relative to the total weight of cationically polymerizable compound(s) (total weight of the cationically polymerizable resin and the other cationically polymerizable compound).

Where necessary, the cationically polymerizable resin composition according to the present invention may further contain any of other additives within ranges not adversely affecting the advantageous effects of the present invention. Examples of such other additives include setting-expandable monomers, photosensitizers (e.g., anthracene sensitizers), resins, adhesion promoters, reinforcers, softeners, plasticizers, viscosity modifiers, solvents, inorganic or organic particles (e.g., nano-scale particles), fluorosilanes, and other known or customary additives.

The cationically polymerizable resin composition according to the present invention can form a cured product by promoting a cationic polymerization reaction through irradiation with light. Exemplary light sources usable herein include mercury lamps, xenon lamps, carbon arc lamps, metal halide lamps, sunlight, electron beams, and laser beams. After the light irradiation, a heat treatment at a temperature of typically from about 50° C. to about 180° C. may be performed to allow curing to further proceed.

The cationic polymerization reaction may be performed under normal atmospheric pressure, under reduced pressure, or under a pressure (under a load). The reaction atmosphere is not limited, as long as adversely affecting the reaction, and may be any atmosphere such as air atmosphere (atmospheric atmosphere), nitrogen atmosphere, or argon atmosphere.

The resulting cured product obtained through cationic polymerization of the cationically polymerizable resin composition according to the present invention may have any shape or form not limited and may for example be in the form of a film or fiber. Such a film-like cured product may be prepared typically by applying the cationically polymerizable resin composition to a substrate using an applicator so as to have a uniform thickness, and irradiating the applied composition with light to promote a cationic polymerization reaction. A fiber-like cured product may be prepared typically by quantitatively extruding the cationically polymerizable resin composition using a syringe, and irradiating the extruded cationically polymerizable resin composition with light to promote a cationic polymerization reaction.

The resulting cured products excel in flexibility and thermal stability. The cationically polymerizable resin composition according to the present invention is therefore useful typically in the areas of waveguides (e.g., optical waveguides and hybrid boards), optical fibers, stress-relaxation adhesives, sealants, underfill materials, inkjet inks, color filters, nanoimprinting, and flexible boards and is particularly useful typically in the areas of flexible optical waveguides, flexible adhesives, and underfill materials.

EXAMPLES

The present invention will be illustrated in further detail with reference to several working examples below. It should be noted, however, that these examples are never construed to limit the scope of the present invention.

Example 1

Production of Cationically Polymerizable Resin

A mixture of 12.05 g of 1-methoxy-2-acetoxypropane (PGMEA), 2.24 g (9.25 mmol) of 3-ethyl-3-(2-acryloyloxyethyloxymethyl)oxetane (EOXTM-EAL) represented by the following formula, and 0.14 g of azobisisobutyronitrile (AIBN) was placed in a Schlenk tube, stirred to be mixed uniformly, and heated with stirring at 75±1° C. for 5 hours. After being cooled, this was purified through recrystallization from a five-fold amount of heptane, held in a vacuum dryer (40° C., full vacuum) for 15 hours, and thereby yielded a liquid resin (1) which is colorless and transparent at room temperature (25° C.)

The liquid resin (1) had a weight-average molecular weight of 18000 and a number-average molecular weight of 6000 each in terms of a polystyrene standard.

[Chem. 7]

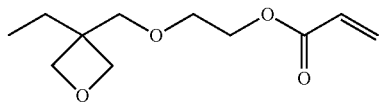

Example 2

Production of Cationically Polymerizable Resin

A mixture of 11.63 g of PGMEA, 2.26 g (8.25 mmol) of 3-ethyl-3-(4-acryloyloxybutyloxymethyl)oxetane (EOXTM- BAL) represented by the following formula, and 0.14 g of AIBN was placed in a Schlenk tube, stirred to be mixed uniformly, and heated with stirring at 75±1° C. for 5 hours. After being cooled, this was purified through recrystallization from a five-fold amount of heptane, held in a vacuum dryer (40° C., full vacuum) for 15 hours, and thereby yielded a liquid resin (2) which is colorless and transparent at room temperature (25° C.)

The liquid resin (2) had a weight-average molecular weight of 21500 and a number-average molecular weight of 8300 each in terms of a polystyrene standard.

[Chem. 8]

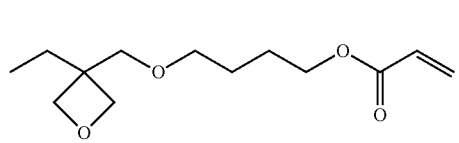

Example 3

Production of Cationically Polymerizable Resin

A mixture of 4.80 g of PGMEA, 2.07 g (7.80 mmol) of 3-ethyl-3-(3-acryloyloxy-2,2-dimethylpropyloxymethyl)oxetane (EOXTM-NPAL) represented by the following formula, and 0.0605 g of AIBN was placed in a Schlenk tube, stirred to be mixed uniformly, and heated with stirring at 75±1° C. for 5 hours. After being cooled to 40° C. or lower, this was purified through recrystallization from a five-fold amount of heptane, held in a vacuum dryer (40° C., full vacuum) for 15 hours, and thereby yielded a liquid resin (3) which is colorless and transparent at room temperature (25° C.)

The liquid resin (3) had a weight-average molecular weight of 37600 and a number-average molecular weight of 14200 each in terms of a polystyrene standard.

[Chem. 9]

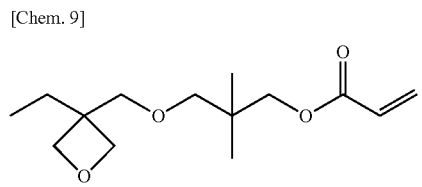

Example 4

Production of Cationically Polymerizable Resin

In a five-necked flask equipped with a monomer dropping line, an initiator dropping line, a thermometer, a reflux condenser, and stirring blades, 25% of a mixture (monomer mixture) of 42.68 g of PGMEA, 6.07 g (0.028 mol) of EOXTM-EAL, and 17.91 g (0.139 mol) of n-butyl acrylate (BA) was placed and heated to 85±1° C. in a nitrogen stream. Next, a mixture of 0.05 g of t-butylperoxy pivalate (trade name "PERBUTYL PV", supplied by NOF Corporation) and 0.77 g of PGMEA was charged, stirred to be mixed uniformly, and, to the resulting mixture with stirring, the remaining 75% of the monomer mixture and a mixture of 0.43 g of AIBN and 4.47 g of PGMEA were added dropwise over 3 hours using delivery pumps. Immediately after the completion of drop- wise addition, a mixture of 0.15 g of AIBN and 1.69 g of PGMEA was charged and, one hour later, a mixture of 0.13 g of AIBN and 1.75 g of PGMEA was charged. The resulting mixture was held for further 2 hours, cooled to 40° C. or lower, and thereby yielded a resin composition. This was purified through reprecipitation from a five-fold amount of a 60 percent by weight methanol aqueous solution, held in a vacuum dryer (40° C., full vacuum) for 60 hours, and thereby yielded a colorless, transparent liquid resin (4).

The liquid resin (4) had a weight-average molecular weight of 67700 and a number-average molecular weight of 12400 each in terms of a polystyrene standard.

Example 5

Production of Cationically Polymerizable Resin

In a five-necked flask equipped with a monomer dropping line, an initiator dropping line, a thermometer, a reflux condenser, and stirring blades, 25% of a mixture (monomer mixture) of 44.91 g of PGMEA, 7.01 g (0.029 mol) of EOXTM-BAL, and 18.62 g (0.144 mol) of BA was placed and heated to 85±1° C. in a nitrogen stream. Next, a mixture of 0.05 g of PERBUTYL PV and 0.60 g of PGMEA was charged, stirred to be mixed uniformly, and, to the resulting mixture with stirring, the remaining 75% of the monomer mixture and a mixture of 0.46 g of AIBN and 5.25 g of PGMEA were added dropwise over 3 hours using delivery pumps. Immediately after the completion of dropwise addition, a mixture of 0.15 g of AIBN and 1.63 g of PGMEA was charged, and, one hour later, a mixture of 0.15 g of AIBN and 1.68 g of PGMEA was charged. The resulting mixture was held for further 2 hours, cooled to 40° C. or lower, and thereby yielded a resin composition. This was purified through reprecipitation from a five-fold amount of a 60 percent by weight methanol aqueous solution, held in a vacuum dryer (40° C., full vacuum) for 60 hours, and thereby yielded a colorless, transparent liquid resin (5).

The liquid resin (5) had a weight-average molecular weight of 78100 and a number-average molecular weight of 12100 each in terms of a polystyrene standard.

Example 6

Production of Cationically Polymerizable Resin

In a five-necked flask equipped with a monomer dropping line, an initiator dropping line, a thermometer, a reflux condenser, and stirring blades, 25% of a mixture (monomer mixture) of 62.07 g of PGMEA, 10.13 g (0.039 mol) of EOXTM-NPAL, and 27.06 g (0.195 mol) of BA was placed and heated to 85±1° C. in a nitrogen stream. Next, a mixture of 0.07 g of PERBUTYL PV and 1.08 g of PGMEA was charged, stirred to be mixed uniformly, and, to the resulting mixture with stirring, the remaining 75% of the monomer mixture and a mixture of 0.63 g of AIBN and 6.47 g of PGMEA were added dropwise over 3 hours using delivery pumps. Immediately after the completion of dropwise addition, a mixture of 0.21 g of AIBN and 2.16 g of PGMEA was charged and, one hour later, a mixture 0.21 g of AIBN and 2.21 g of PGMEA was charged. The resulting mixture was held for further 2 hours, cooled to 40° C. or lower, and thereby yielded a resin composition. This was purified through reprecipitation from a five-fold amount of a 60 percent by weight methanol aqueous solution, held in a vacuum dryer (40° C., full vacuum) for 60 hours, and thereby yielded a colorless, transparent liquid resin (6).

The liquid resin (6) had a weight-average molecular weight of 67600 and a number-average molecular weight of 11800 each in terms of a polystyrene standard.

Example 7

Production of Cationically Polymerizable Resin

In a five-necked flask equipped with a monomer dropping line, an initiator dropping line, a thermometer, a reflux condenser, and stirring blades, 29.64 g of PGMEA was placed and heated to 85±1° C. in a nitrogen stream. Next, to the stirred PGMEA, a mixture of 45.45 g of PGMEA, 10.00 g (0.039 mol) of EOXTM-NPAL, 15.06 g (0.117 mol) of BA, and 2.88 g of dimethyl 2,2'-azobis(isobutyrate) (trade name "V-601", supplied by Wako Pure Chemical Industries, Ltd.) was added dropwise over 5 hours using a delivery pump. After the completion of dropwise addition, the resulting mixture was held for further 2 hours, cooled to 40° C. or lower, and thereby yielded a resin composition. This was purified through reprecipitation from a five-fold amount of a 60 percent by weight methanol aqueous solution, held in a vacuum dryer (40° C., full vacuum) for 60 hours, and thereby yielded a colorless, transparent liquid resin (7).

The liquid resin (7) had a weight-average molecular weight of 3700 and a number-average molecular weight of 1900 each in terms of a polystyrene standard.

Example 8

Production of Cationically Polymerizable Resin

In a five-necked flask equipped with a monomer dropping line, an initiator dropping line, a thermometer, a reflux condenser, and stirring blades, 42.10 g of PGMEA was placed and heated to 85±1° C. in a nitrogen stream. Next, to the stirred PGMEA, a mixture of 64.07 g of PGMEA, 20.16 g (0.078 mol) of EOXTM-NPAL, 15.06 g (0.117 mol) of BA, and 3.60 g of "V-601" was added dropwise over 5 hours using a delivery pump. After the completion of dropwise addition, the resulting mixture was held for further 2 hours, cooled to 40° C. or lower, and thereby yielded a resin composition. This was purified through reprecipitation from a five-fold amount of a 60 percent by weight methanol aqueous solution, held in a vacuum dryer (40° C., full vacuum) for 60 hours, and thereby yielded a colorless, transparent liquid resin (8).

The liquid resin (8) had a weight-average molecular weight of 3900 and a number-average molecular weight of 2400 each in terms of a polystyrene standard.

Example 9

Production of Cationically Polymerizable Resin

In a five-necked flask equipped with a monomer dropping line, an initiator dropping line, a thermometer, a reflux condenser, and stirring blades, 24.93 g of PGMEA was placed and heated to 75±1° C. in a nitrogen stream. Next, to the stirred PGMEA, a mixture of 43.64 g of PGMEA, 20.08 g (0.078 mol) of EOXTM-NPAL, 50.59 g (0.39 mol) of BA, and 0.043 g of "V-601" was added dropwise over 5 hours using a delivery pump. After the completion of dropwise addition, the resulting mixture was held for further 2 hours, cooled to 40° C. or lower, and thereby yielded a resin composition. This was diluted with 140.04 g of PGMEA, purified through reprecipitation from a five-fold amount of a 60 percent by weight methanol aqueous solution, held in a vacuum dryer (40° C., full vacuum) for 60 hours, and thereby yielded a colorless, transparent liquid resin (9).

The liquid resin (9) had a weight-average molecular weight of 288000 and a number-average molecular weight of 61200 each in terms of a polystyrene standard.

Comparative Example 1

Production of Cationically Polymerizable Resin

In a five-necked flask equipped with a monomer dropping line, an initiator dropping line, a thermometer, a reflux condenser, and stirring blades, 25% of a mixture (monomer mixture) of 84.07 g of PGMEA, 10.25 g (0.059 mol) of 3-ethyl-3-acryloyloxymethyl-oxetane (EOXTM-AL, supplied by Osaka Organic Chemical Industry Ltd.), and 38.55 g (0.294 mol) of BA was placed and heated to 85±1° C. in a nitrogen stream. Next, a mixture of 0.12 g of PERBUTYL PV and 1.14 g of PGMEA was charged, stirred to be mixed uniformly, and, to the resulting mixture with stirring, the remaining 75% of the monomer mixture and a mixture of 0.87 g of AIBN and 9.04 g of PGMEA were added dropwise over 3 hours using delivery pumps. Immediately after the completion of dropwise addition, a mixture of 0.29 g of AIBN and 3.01 g of PGMEA was charged and, one hour later, a mixture of 0.29 g of AIBN and 2.91 g of PGMEA was charged. The resulting mixture was held for further 2 hours, cooled to 40° C. or lower, and thereby yielded a resin composition. This was purified through reprecipitation from a five-fold amount of a 60 percent by weight methanol aqueous solution, held in a vacuum dryer (40° C., full vacuum) for 60 hours, and thereby yielded a colorless, transparent liquid resin (10).

The liquid resin (10) had a weight-average molecular weight of 62800 and a number-average molecular weight of 20000 each in terms of a polystyrene standard.

Comparative Example 2

Production of Cationically Polymerizable Resin

A mixture of 12.23 g of PGMEA, 3.21 g (0.012 mmol) of EOXTM-AL, and 0.14 g of AIBN was placed in a Schlenk tube, stirred to be mixed uniformly, and heated with stirring at 75±1° C. for 5 hours. After being cooled, this was purified through recrystallization from a five-fold amount of heptane, held in a vacuum dryer (40° C., full vacuum) for 15 hours, and thereby yielded a liquid resin (11) which is colorless and transparent at room temperature (25° C.)

The liquid resin (11) had a weight-average molecular weight of 36700 and a number-average molecular weight of 17000 each in terms of a polystyrene standard.

Examples 10 to 49 and Comparative Examples 3 to 6

Cationically polymerizable resin compositions were prepared by compounding components in the formulations and compositional ratios given in Tables 1 and 2 below. Numerals in the tables are indicated in parts by weight.

Evaluations

The cationically polymerizable resin compositions obtained in Examples 10 to 49 and Comparative Examples 3 to 6 were subjected to polymerization according to a method mentioned below to give cured products, and the resulting cured products were examined on flexibility and thermal stability.

[Formation of Film-Like Cured Products]

Each of the cationically polymerizable resin compositions obtained in Examples 10 to 49 and Comparative Examples 3 to 6 was applied to a non-silicone release film base (trade name "T789", supplied by Daicel Value Coating Ltd.) so as to have a thickness of about 100 μm using an applicator, was irradiated with ultraviolet rays (irradiation energy: about 2 J, wavelength: 320 to 390 nm) using a belt-conveyer type ultraviolet irradiator (UVC-02516S1AA02, supplied by Ushio Inc.), and thereby yielded a series of film-like cured products.

[Formulation of Fiber-like Cured Products]

Each of the cationically polymerizable resin compositions obtained in Examples 10 to 49 and Comparative Examples 3 to 6 was charged into a syringe, quantitatively (3 mL/second) extruded, the extruded cationically polymerizable resin composition was irradiated with ultraviolet rays (irradiation energy: 1.5 W/cm$^2$ per one direction, wavelength: 365 nm), and thereby yielded a series of fiber-like cured products having a diameter of 50 to 2000 μm.

[Evaluation of Flexibility]

Each of the film-like cured products about 100 μm thick obtained in Examples 10 to 49 and Comparative Examples 3 to 6 was placed around a rod, whether the sample suffered from cracks (cracking) or not was visually observed, and the flexibility of the sample was evaluated according to the following criteria.

Criteria:

Very good (VG): Sample, when placed around a rod 1 mm in radius, does not suffer from cracks (cracking)

Good: Sample, when placed around a rod 2 mm in radius, does not suffer from cracks (cracking)

Poor: Sample, when placed around a rod 2 mm in radius, suffers from cracks (cracking)

[Evaluation of Thermal Stability]

Each of the film-like cured products about 100 μm thick obtained in Examples 10 to 49 and Comparative Examples 3 to 6 was subjected to thermogravimetry using a thermal analyzer (trade name "TG-DTA6300", supplied by Seiko Instruments Inc.). With reference to FIG. 1, a temperature at the point, where the tangent line of a region with no weight loss or gradual weight loss in early stages of temperature rise intersects with the tangent line of the inflection point of a region with abrupt weight loss, is defined as a pyrolysis temperature T, and the thermal stability of the sample was evaluated according to the following criteria.

Criteria:

Good: Sample has a pyrolysis temperature T (° C.) of 260° C. or higher

Poor: Sample has a pyrolysis temperature T (° C.) of lower than 260° C.

The results are collectively indicated in the following tables.

TABLE 1

| | | Examples | | | | | | | | |
|---|---|---|---|---|---|---|---|---|---|---|
| | | 10 | 11 | 12 | 13 | 14 | 15 | 16 | 17 | 18 |
| Cationically polymerizable polymer | Liquid resin (1) | 100 | | | | | | | | |
| | Liquid resin (2) | | 100 | | | | | | | |
| | Liquid resin (3) | | | 100 | | | | | | |
| | Liquid resin (4) | | | | 90 | | | | | 80 |
| | Liquid resin (5) | | | | | 90 | | | | |
| | Liquid resin (6) | | | | | | 90 | | | |
| | Liquid resin (7) | | | | | | | 90 | | |
| | Liquid resin (8) | | | | | | | | 90 | |
| | Liquid resin (9) | | | | | | | | | |
| | Liquid resin (10) | | | | | | | | | |
| | Liquid resin (11) | | | | | | | | | |
| Other cationically polymerizable compound | B1 | | | | 10 | 10 | 10 | 10 | 10 | 20 |
| | B2 | | | | | | | | | |
| | B3 | | | | | | | | | |
| | B4 | | | | | | | | | |
| Inorganic microparticle | | | | | | | | | | |
| General-purpose resin | PS | | | | | | | | | |
| | PMMA | | | | | | | | | |
| Light-activatable acid generator | CPI-100P | 3 | 3 | 3 | 3 | 3 | 3 | 3 | 3 | 3 |
| Evaluations | Thermal stability | Good | Good | Good | Good | Good | Good | Good | Good | Good |
| | Flexibility | Good | Good | Good | VG | VG | VG | VG | VG | VG |

| | | Examples | | | | | | | | |
|---|---|---|---|---|---|---|---|---|---|---|
| | | 19 | 20 | 21 | 22 | 23 | 24 | 25 | 26 | 27 |
| Cationically polymerizable polymer | Liquid resin (1) | | | | | | | | | |
| | Liquid resin (2) | | | | | | | | | |
| | Liquid resin (3) | | | | | | | | | |
| | Liquid resin (4) | | | | | | 70 | | | |
| | Liquid resin (5) | 80 | | | | | | 70 | | |
| | Liquid resin (6) | | 80 | | | | | | 70 | |
| | Liquid resin (7) | | | 80 | | | | | | 70 |
| | Liquid resin (8) | | | | 80 | | | | | 70 |
| | Liquid resin (9) | | | | | | | | | |
| | Liquid resin (10) | | | | | | | | | |
| | Liquid resin (11) | | | | | | | | | |
| Other cationically polymerizable compound | B1 | 20 | 20 | 20 | 20 | 30 | 30 | 30 | 30 | 30 |
| | B2 | | | | | | | | | |
| | B3 | | | | | | | | | |
| | B4 | | | | | | | | | |

TABLE 1-continued

|  |  |  |  |  |  |  |  |  |  |
|---|---|---|---|---|---|---|---|---|---|
| Inorganic microparticle |  |  |  |  |  |  |  |  |  |
| General-purpose resin | PS |  |  |  |  |  |  |  |  |
|  | PMMA |  |  |  |  |  |  |  |  |
| Light-activatable acid generator | CPI-100P | 3 | 3 | 3 | 3 | 3 | 3 | 3 | 3 | 3 |
| Evaluations | Thermal stability | Good | Good | Good | Good | Good | Good | Good | Good | Good |
|  | Flexibility | VG | VG | VG | VG | VG | VG | VG | VG | VG |

TABLE 2

|  |  | Examples |  |  |  |  |  |  |  |  |
|---|---|---|---|---|---|---|---|---|---|---|
|  |  | 28 | 29 | 30 | 31 | 32 | 33 | 34 | 35 | 36 |
| Cationically polymerizable polymer | Liquid resin (1) |  |  |  |  |  |  |  |  |  |
|  | Liquid resin (2) |  |  |  |  |  |  |  |  |  |
|  | Liquid resin (3) |  |  |  |  |  |  |  |  |  |
|  | Liquid resin (4) | 60 |  |  |  |  |  | 50 |  |  |
|  | Liquid resin (5) |  | 60 |  |  |  |  |  | 50 |  |
|  | Liquid resin (6) |  |  | 60 |  |  |  |  |  | 50 |
|  | Liquid resin (7) |  |  |  | 60 |  |  |  |  |  |
|  | Liquid resin (8) |  |  |  |  | 60 |  |  |  |  |
|  | Liquid resin (9) |  |  |  |  |  | 60 |  |  |  |
|  | Liquid resin (10) |  |  |  |  |  |  |  |  |  |
|  | Liquid resin (11) |  |  |  |  |  |  |  |  |  |
| Other cationically polymerizable compound | B1 | 40 | 40 | 40 | 25 | 25 |  | 50 | 50 | 50 |
|  | B2 |  |  |  | 15 | 15 |  |  |  |  |
|  | B3 |  |  |  |  |  | 35 |  |  |  |
|  | B4 |  |  |  |  |  | 5 |  |  |  |
| Inorganic microparticle |  |  |  |  |  |  |  |  |  |  |
| General-purpose resin | PS |  |  |  |  |  |  |  |  |  |
|  | PMMA |  |  |  |  |  |  |  |  |  |
| Light-activatable acid generator | CPI-100P | 3 | 3 | 3 | 3 | 3 | 3 | 3 | 3 | 3 |
| Evaluations | Thermal stability | Good | Good | Good | Good | Good | Good | Good | Good | Good |
|  | Flexibility | VG | VG | VG | VG | VG | VG | VG | VG | VG |

|  |  | Examples |  |  |  |  |  |  |  |  |
|---|---|---|---|---|---|---|---|---|---|---|
|  |  | 37 | 38 | 39 | 40 | 41 | 42 | 43 | 44 | 45 |
| Cationically polymerizable polymer | Liquid resin (1) |  |  |  |  |  |  |  |  |  |
|  | Liquid resin (2) |  |  |  |  |  |  |  |  |  |
|  | Liquid resin (3) |  |  |  |  |  |  |  |  |  |
|  | Liquid resin (4) |  |  |  |  |  |  |  |  |  |
|  | Liquid resin (5) |  |  |  |  |  |  |  |  |  |
|  | Liquid resin (6) |  |  |  |  |  |  |  |  |  |
|  | Liquid resin (7) | 50 |  |  | 40 |  |  | 20 |  |  |
|  | Liquid resin (8) |  | 50 |  |  | 40 |  |  | 20 |  |
|  | Liquid resin (9) |  |  | 50 |  |  | 40 |  |  | 20 |
|  | Liquid resin (10) |  |  |  |  |  |  |  |  |  |
|  | Liquid resin (11) |  |  |  |  |  |  |  |  |  |
| Other cationically polymerizable compound | B1 | 30 | 30 |  | 40 | 40 |  | 50 | 50 |  |
|  | B2 | 20 | 20 |  | 20 | 20 |  | 30 | 30 |  |
|  | B3 |  |  | 45 |  |  | 55 |  |  | 75 |
|  | B4 |  |  | 5 |  |  | 5 |  |  | 5 |
| Inorganic microparticle |  |  |  |  |  |  |  |  |  |  |
| General-purpose resin | PS |  |  |  |  |  |  |  |  |  |
|  | PMMA |  |  |  |  |  |  |  |  |  |
| Light-activatable acid generator | CPI-100P | 3 | 3 | 3 | 3 | 3 | 3 | 3 | 3 | 3 |
| Evaluations | Thermal stability | Good | Good | Good | Good | Good | Good | Good | Good | Good |
|  | Flexibility | VG | VG | VG | Good | Good | Good | Good | Good | Good |

TABLE 3

| | | Examples | | | | Comparative Examples | | | |
|---|---|---|---|---|---|---|---|---|---|
| | | 46 | 47 | 48 | 49 | 3 | 4 | 5 | 6 |
| Cationically polymerizable polymer | Liquid resin (1) | | | | | | | | |
| | Liquid resin (2) | | | | | | | | |
| | Liquid resin (3) | | | | | | | | |
| | Liquid resin (4) | | | | | | | | |
| | Liquid resin (5) | | | | | | | | |
| | Liquid resin (6) | | | | | | | | |
| | Liquid resin (7) | 19 | 18 | 14 | 10 | | | | |
| | Liquid resin (8) | | | | | | | | |
| | Liquid resin (9) | | | | | | | | |
| | Liquid resin (10) | | | | | 100 | | | |
| | Liquid resin (11) | | | | | | 100 | | |
| Other cationically polymerizable compound | B1 | 48 | 45 | 35 | 25 | | | | |
| | B2 | 28 | 27 | 21 | 15 | | | | |
| | B3 | | | | | | | | |
| | B4 | | | | | | | | |
| Inorganic microparticle | | 5 | 10 | 30 | 50 | | | | |
| General-purpose resin | PS | | | | | | | 100 | |
| | PMMA | | | | | | | | 100 |
| Light-activatable acid generator | CPI-100P | 3 | 3 | 3 | 3 | 3 | 3 | | |
| Evaluations | Thermal stability | Good | Good | Good | Good | — | — | Poor | Poor |
| | Flexibility | Good | Good | Good | Good | — | — | Poor | Poor |

B1: 3,3-Bis(vinyloxymethyl)oxetane
B2: 3-Ethyl-3-(2-ethylhexyloxymethyl)oxetane (trade name "OXT-212", supplied by Toagosei Co., Ltd.)
B3: 3-Ethyl-3[[(3-ethyloxetan-3-yl)methoxy]methyl]oxetane (trade name "OXT-221", supplied by Toagosei Co., Ltd.)
B4: 3,4-Epoxycyclohexenylmethyl 3',4'-epoxycyclohexenecarboxylate represented by the following formula (trade name "CELLOXIDE 2021P", supplied by Daicel Corporation):

[Chem. 10]

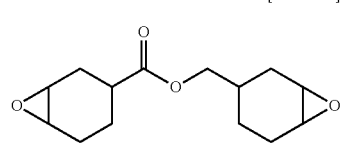

Inorganic microparticles: Surface-treated silica (trade name "SC4500-SEJ", supplied by Admatechs Company Limited)
PS: Polystyrene
PMMA: Poly(methyl methacrylate)
CPI-100P: Mixture of diphenyl[4-(phenylthio)phenyl]sulfonium hexafluorophosphate, thiodi-p-phenylenebis(zophenylsulfonium), bis(hexafluorophosphate), propylene carbonate, zophenyl sulfide (trade name "CPI-100P", supplied by SAN-APRO LIMITED)
Remarks: The symbol "—" in evaluation of Comparative Examples 3 and 4 indicates that the evaluation was not performed due to insufficient curing.

INDUSTRIAL APPLICABILITY

The cationically polymerizable resins according to the present invention are rapidly cured through cationic polymerization and can form cured products which have flexibility, stress relaxation action, and such thermal stability as to support solder reflow mounting (particularly lead-free solder mounting). The cationically polymerizable resins according to the present invention are therefore advantageously usable typically in the areas of waveguides (e.g., optical waveguides and hybrid boards), optical fibers, stress-relaxation adhesives, sealants, underfill materials, ink-jet inks, color filters, nanoimprinting, and flexible boards and particularly advantageously usable typically in the areas of flexible optical waveguides, flexible adhesives, and underfill materials.

The invention claimed is:

1. A cationically polymerizable resin obtained through radical polymerization of an oxetane-ring-containing (meth)acryloyl compound alone or in combination with another radically polymerizable compound, the oxetane-ring-containing (meth)acryloyl compound being represented by following Formula (1):

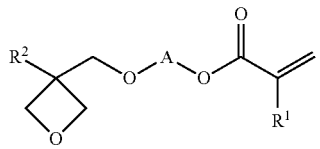

(1)

wherein $R^1$ represents hydrogen atom or methyl group; $R^2$ represents hydrogen atom or an alkyl group; and "A" represents a linear alkylene group represented by the following Formula (a1) or a branched chain alkylene group represented by the following Formula (a2):

(a1)

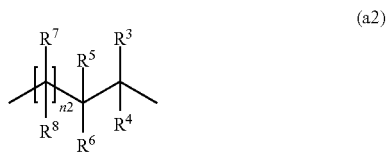

(a2)

wherein n1 denotes an integer of 4 to 20; $R^3$, $R^4$, $R^7$, and $R^8$ are the same as or different from one another and each represent a hydrogen atom or an alkyl group; $R^5$ and $R^6$ are the same as or different from each other and each represent an alkyl group; and n2 denotes an integer of 1 to 20; when n2 is an integer of 2 or more, two or more $R^7$s may be the same as or different from one another, and two or more $R^8$s may be the same as or different from one another.

2. The cationically polymerizable resin according to claim 1, wherein the other radically polymerizable compound is a compound having one functional group selected from the group consisting of a (meth)acryloyl group, a (meth)acryloyloxy group, a (meth)acryloylamino group, a vinylaryl group, a vinyl ether group, and a vinyloxycarbonyl group per one molecule.

3. A cationically polymerizable resin composition comprising the cationically polymerizable resin of claim 1 as a cationically polymerizable compound.

4. The cationically polymerizable resin composition according to claim 3, further comprising another cationically polymerizable compound than the cationically polymerizable resin.

5. The cationically polymerizable resin composition according to claim 4, wherein the other cationically polymerizable compound than the cationically polymerizable resin is a compound having one or more functional groups selected from the group consisting of oxetane rings, epoxy rings, vinyl ether groups, and vinylaryl groups per one molecule.

6. The cationically polymerizable resin composition according to claim 3, further comprising a cationic-polymerization initiator.

7. A cured product obtained through cationic polymerization of the cationically polymerizable resin of claim 1.

8. The cured product according to claim 7, in the form of a film.

9. The cured product according to claim 7, in the form of a fiber.

10. A cationically polymerizable resin composition comprising the cationically polymerizable resin of claim 2 as a cationically polymerizable compound.

11. The cationically polymerizable resin composition according to claim 10, further comprising another cationically polymerizable compound than the cationically polymerizable resin.

12. The cationically polymerizable resin composition according to claim 4, further comprising a cationic-polymerization initiator.

13. The cationically polymerizable resin composition according to claim 5, further comprising a cationic-polymerization initiator.

14. A cured product obtained through cationic polymerization of the cationically polymerizable resin of claim 2.

15. A cured product obtained through cationic polymerization of the cationically polymerizable resin composition of claim 3.

16. A cured product obtained through cationic polymerization of the cationically polymerizable resin composition of claim 4.

17. A cured product obtained through cationic polymerization of the cationically polymerizable resin composition of claim 5.

* * * * *